(12) United States Patent
Takahashi et al.

(10) Patent No.: US 7,652,700 B2
(45) Date of Patent: Jan. 26, 2010

(54) INTERPOLATION METHOD FOR CAPTURED COLOR IMAGE DATA

(75) Inventors: Yoshihisa Takahashi, Tochigi (JP); Hisakazu Kikuchi, Niigata (JP); Shogo Muramatsu, Niigata (JP); Yoshito Abe, Niigata (JP); Naoki Mizutani, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 267 days.

(21) Appl. No.: 11/661,709

(22) PCT Filed: Jul. 27, 2005

(86) PCT No.: PCT/US2005/027245

§ 371 (c)(1),
(2), (4) Date: Mar. 1, 2007

(87) PCT Pub. No.: WO2006/052306

PCT Pub. Date: May 18, 2006

(65) Prior Publication Data

US 2007/0247530 A1   Oct. 25, 2007

(30) Foreign Application Priority Data

Nov. 9, 2004   (JP)   ............................. 2004-325761

(51) Int. Cl.
*H04N 3/14*   (2006.01)
*H04N 5/335*   (2006.01)
*H04N 9/04*   (2006.01)
*H04N 9/083*   (2006.01)
*H04N 5/228*   (2006.01)

(52) U.S. Cl. ........................ 348/273; 348/272; 348/280; 348/222.1

(58) Field of Classification Search ................. 348/280
See application file for complete search history.

(56) References Cited

U.S. PATENT DOCUMENTS

| 4,642,678 | A |   | 2/1987  | Cok |
|---|---|---|---|---|
| 5,373,322 | A | * | 12/1994 | Laroche et al. ............. 348/273 |
| 5,629,734 | A |   | 5/1997  | Hamilton, Jr. et al. |
| 7,053,944 | B1 | * | 5/2006 | Acharya et al. ............. 348/273 |
| 2003/0214594 | A1 | * | 11/2003 | Bezryadin ................... 348/280 |
| 2004/0105014 | A1 | * | 6/2004 | Yamamoto et al. ........ 348/222.1 |
| 2004/0141072 | A1 | * | 7/2004 | Nilsson et al. .............. 348/272 |

OTHER PUBLICATIONS

"Demosaicing Methods for Bayer Color Arrays" by R. Ramanath et al., Journal of Electronic Imaging, vol. 11, No. 3, pp. 306-315, 2002.

* cited by examiner

*Primary Examiner*—Sinh Tran
*Assistant Examiner*—Wanda M Negron
(74) *Attorney, Agent, or Firm*—Thomas J. Strouse; Peyton C. Watkins

(57) ABSTRACT

To achieve more appropriate interpolation of a missing pixel, an image is input to a processing section for interpolation. The interpolation is applied utilizing image data of pixels located around the pixel to be interpolated. Specifically, correlations between the image data of the pixels to be interpolated, and pixel data in a horizontal direction, vertical direction, and diagonal direction, are compared to one another; pixel data having stronger correlation is used for the interpolation. Correlation between the image data of the pixels to be interpolated and which direction is strong is determined, so that different weighting for interpolation is used accordingly.

4 Claims, 5 Drawing Sheets

| R11 | G12 | R13 | G14 | R15 |
| --- | --- | --- | --- | --- |
| G21 | B22 | G23 | B24 | G25 |
| R31 | G32 | R33 | G34 | R35 |
| G41 | B42 | G43 | B44 | G45 |
| R51 | G52 | R53 | G54 | R55 |

INTERPOLATION METHOD FOR CAPTURED COLOR IMAGE DATA

FIELD OF THE INVENTION

The present invention relates to interpolation of captured color image data, in which, based on captured color image data having single-color image data for each pixel, image data on other colors for each pixel are interpolated.

BACKGROUND OF THE INVENTION

Single plate CCD cameras, in which a color filter is provided for each pixel to obtain image data on each of the RGB colors for each pixel, are widely used. In image capturing using such a CCD camera, an image which has passed through an optical antialias filter is detected by light receiving elements having color filters, whereby RGB image signals are obtained. An image capturing process can be modeled as shown in FIG. 1. Specifically, an image of a scene for image capturing passes through an optical antialias filter 1, and then enters a color filter array (CFA) 2, where the image is converted into RGB image signals. Thus, after being blurred to some extent by means of an optical system, the RGB image signals are sampled as RGB mosaic images.

Here, many of the single plate image capturing devices employ a Bayer-pattern CFA, where RGB image capturing pixels are arranged in a matrix, as shown in FIG. 2. An image obtained using an image capturing device (for example, a CCD) which employs a Bayer CFA is a mosaic image, which has green data for a half of the entire pixels, red data for a quarter of the entire pixels, and blue data for a quarter of the entire pixels. Therefore, in order to obtain a normal captured color image based on a mosaic image obtained using an image capturing device, restoration of the data on a missing pixel is required. This process for restoration is referred to as demosaicing.

Demosaicing, however, has problems, including, for example, false color and/or zipper noise in a restored image, which must be suppressed, and reduction of sharpness of a restored image, which must be enhanced. False color refers to a phenomenon in which a color which does not exist in an original image is produced in a restored image. Zipper noise refers to a phenomenon in which high frequency component is decreased, producing artifact in the form of a broken line.

A general demosaicing method includes low pass filtering. In demosaicing by means of filtering, fineness of and occurrence of false color in a restored image retain trade-off relationship.

In connection with the above, U.S. Pat. No. 5,629,734 discloses "Adaptive Color Plane Interpolation (ACPI)"; U.S. Pat. No. 5,373,322 discloses "Gradient Based Interpolation (GBI)", and U.S. Pat. No. 4,642,678 discloses "Constant Hue-Based Interpolation (CHBI)".

According to ACPI disclosed in U.S. Pat. No. 5,629,734, green data is interpolated by adding a secondary gradient of red or blue pixel values to the average of the adjacent pixel values, and red or blue data is interpolated by adding a secondary gradient of green pixel values to the average of the adjacent pixel values.

According to GBI disclosed in U.S. Pat. No. 5,373,322, green data is interpolated using the average of the adjacent pixel values, and red and blue data is interpolated by adding a green pixel value to a differential average of blue and green or red and green pixel values.

According to CHBI disclosed in U.S. Pat. No. 4,642,678, green data is interpolated using the average of the adjacent pixel values, and red and blue data is interpolated by multiplying the average of R/G or B/G by a green pixel value.

According to "Demosaicing Methods for Bayer Color Arrays," (by R. Ramanath, W. E. Snyder, G. L. Bilbro, Journal of Electronic Imaging, Vol. 11, No. 3, pp. 306-315, 2002), performances attained using those prevailing methods are compared, with a conclusion obtained that the ACPI exhibits the highest performance.

ACPI, however, is problematic in that, although it can provide a fine image with less false color or zipper noise, isolated points become more common. The present invention advantageously achieve restoration of a more suitable image.

SUMMARY OF THE INVENTION

The present invention has been conceived to overcome the above problems and aims to provide a method for interpolating captured color image data by interpolating, based on captured color image data having single-color image data for each pixel, pixel data on other colors of each pixel, the method comprising a correlation detecting step of detecting correlation between image data of an object pixel and image data of peripheral pixels located in at least two directions selected from among horizontal, vertical, and diagonal directions relative to the object pixel; a first correlation determining step of determining a direction having strong correlation, based on the correlation detected; a second correlation determining step of determining, as for the direction determined as having strong correlation, correlation between the image data of the object pixel and image data of a pixel located in which direction relative to a location of the object pixel is strong; an interpolation step of calculating image data on a color for interpolation of the object pixel, in which a weight to be applied to image data of the pixel located in the direction determined at the second correlation determining step as having stronger correlation is increased based on image data of a peripheral pixel for a color same as the color for interpolation, located in the direction determined at the first correlation determining step as having stronger correlation, based on results of the determinations made at the first and second correlation determining steps.

In method as above, the calculation of the image data of the object pixel on the color for interpolation in the interpolation step may preferably be performed by adding the image data and weighted difference between the image data of the object pixel and image data on a color same as the color of the object pixel, of a peripheral pixel located in the direction selected from among horizontal, vertical, and diagonal directions relative to the object pixel.

The correlation detecting step may preferably include detection of a value α and a value β, and the first correlation determining step includes comparison between the values α and β to determine that correlation associated with a value which is smaller is stronger. In the above, the value α may be a sum of an absolute value of a difference between image data on a color same as the color for interpolation, of pixels located in a horizontal direction relative to the object pixel with the object pixel placed therebetween, an absolute value of a difference between the image data of the object pixel and image data on a color same as the color of the object pixel, of a peripheral pixel located to the left of the object pixel, and an absolute value of a difference between the image data of the object pixel and image data on the color same as the color of the object pixel, of a peripheral pixel located to the right of the object pixel, and the value β may be a sum of an absolute value of a difference between image data on a color same as the color for interpolation, of pixels located in a vertical direction relative to the object pixel with the object pixel placed therebetween, an absolute value of a difference between the image data of the object pixel and image data on a color same as the color of the object pixel, of a peripheral pixel located above the object pixel, and an absolute value of a difference between the image data of the object pixel and image data on the color same as the color of the object pixel, of a peripheral pixel located below the object pixel.

The sharpening processing may preferably be applied to an interpolated image obtained, by repetitively applying a predetermined sharpening operation thereto.

According to another aspect of the present invention, there is provided a program product for having a computer to interpolate captured color image data by interpolating, based on captured color image data which has single-color image data for each pixel, pixel data on other colors of each pixel, the program product having the computer to perform a correlation detecting step of detecting correlation between image data of an object pixel and image data of peripheral pixels located in at least two directions selected from among horizontal, vertical, and diagonal directions relative to the object pixel; a first correlation determining step of determining a direction having strong correlation, based on the correlation detected; a second correlation determining step of determining, as for the direction determined as having strong correlation, correlation between the image data of the object pixel and image data of a pixel located in which direction relative to a location of the object pixel is strong; an interpolation step of calculating image data on a color for interpolation of the object pixel, in which a weight to be applied to image data of the pixel located in the direction determined at the second correlation determining step as having stronger correlation is increased based on image data of a peripheral pixel for a color same as the color for interpolation, located in the direction determined at the first correlation determining step as having stronger correlation, based on results of the determinations made at the first and second correlation determining steps.

DETAILED DESCRIPTION OF THE INVENTION

Figures 1, 2:
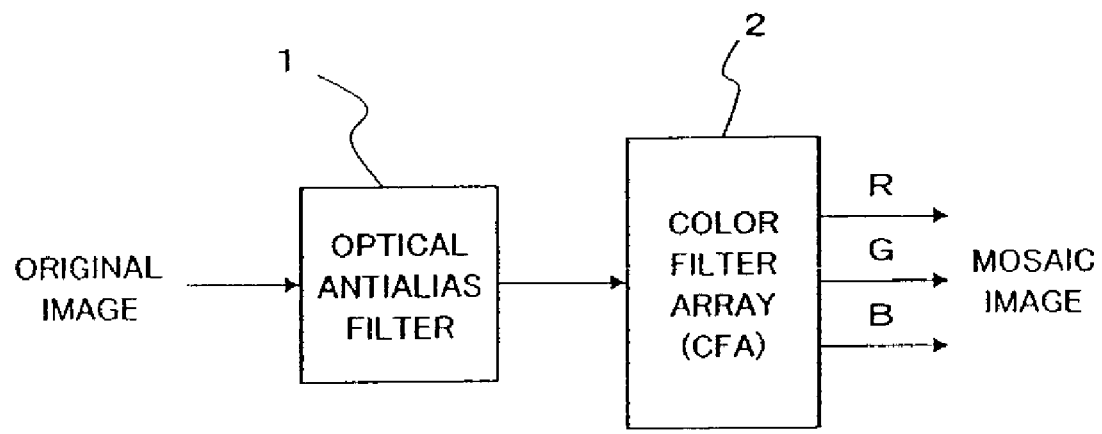
FIG. 1 is a diagram illustrating an image capturing process.
FIG. 2 is a diagram showing a Bayer-type CFA.

In the following, an embodiment of the present invention will be described based on the drawings. In this embodiment, Asymmetric Average Interpolation (AAI), which consists of two steps including interpolation of a missing pixel and sharpening of an image, is carried out. As an example, interpolation of a missing pixel for a mosaic image in Bayer sequence, as shown in FIG. 2, will be described.

AAI of the present invention and ACPI of U.S. Pat. No. 5,629,734 are commonly characterized in that, while relaying on the fact that correlation among red, green, blue is generally strong, the value of a missing pixel for green is first interpolated using a secondary gradient of red or blue pixel values, and the value of a missing pixel for red and blue is interpolated using a secondary gradient of green pixel values. That is, a gradient of image data is utilized in detection of the correlation of pixel data in this embodiment.

Figure 3:
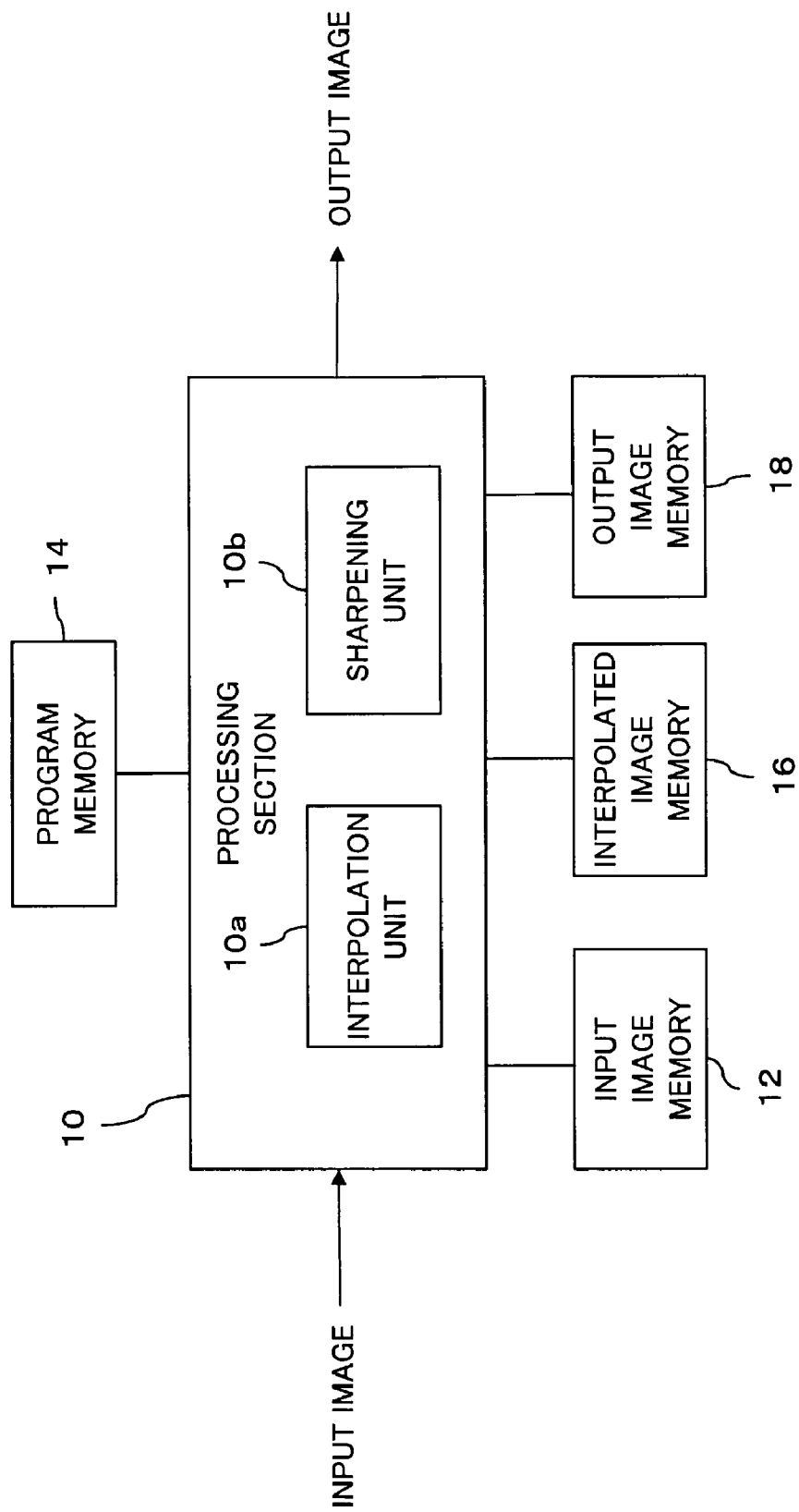
FIG. 3 is a diagram showing a structure of a device in an embodiment.

Image processing according to this embodiment can be performed using a typical computer. A functional structure of a device for image processing is shown in FIG. 3.

Specifically, an image signal obtained using a single plate CCD camera is input as an input image to a processing section 10. The processing section 10 stores the input image in an input image memory 12, and also reads out data on a required portion, or a block to be processed, from the input image memory 12 for interpolation. The interpolation is performed by an interpolation unit 10a by executing an interpolation program stored in a program memory 14. Through interpolation, interpolated data for a missing pixel is obtained, and accordingly interpolated image data is obtained. The interpolated image data is then stored in the interpolated image memory 16.

The processing section 10 then sharpens the obtained interpolated image data. The sharpening is performed by a sharpening unit 10b in the processing section 10 by executing a sharpening program stored in the program memory 14. The resultant sharpened image data is stored in an output image memory 18 to be later output as an output image.

In the following, interpolation and sharpening will be individually described.

Interpolation for Green

At any position where there is no green pixel, there is always either a red or a blue pixel, which always has green pixels at four adjacent positions, specifically north, east, south, and west of (that is, above, right of, below, and left of) that red or blue pixels. In this case, the average of the adjacent green pixel values and a secondary gradient of the red or blue pixel values are used for interpolation of the value of the missing green pixel.

Figure 4:
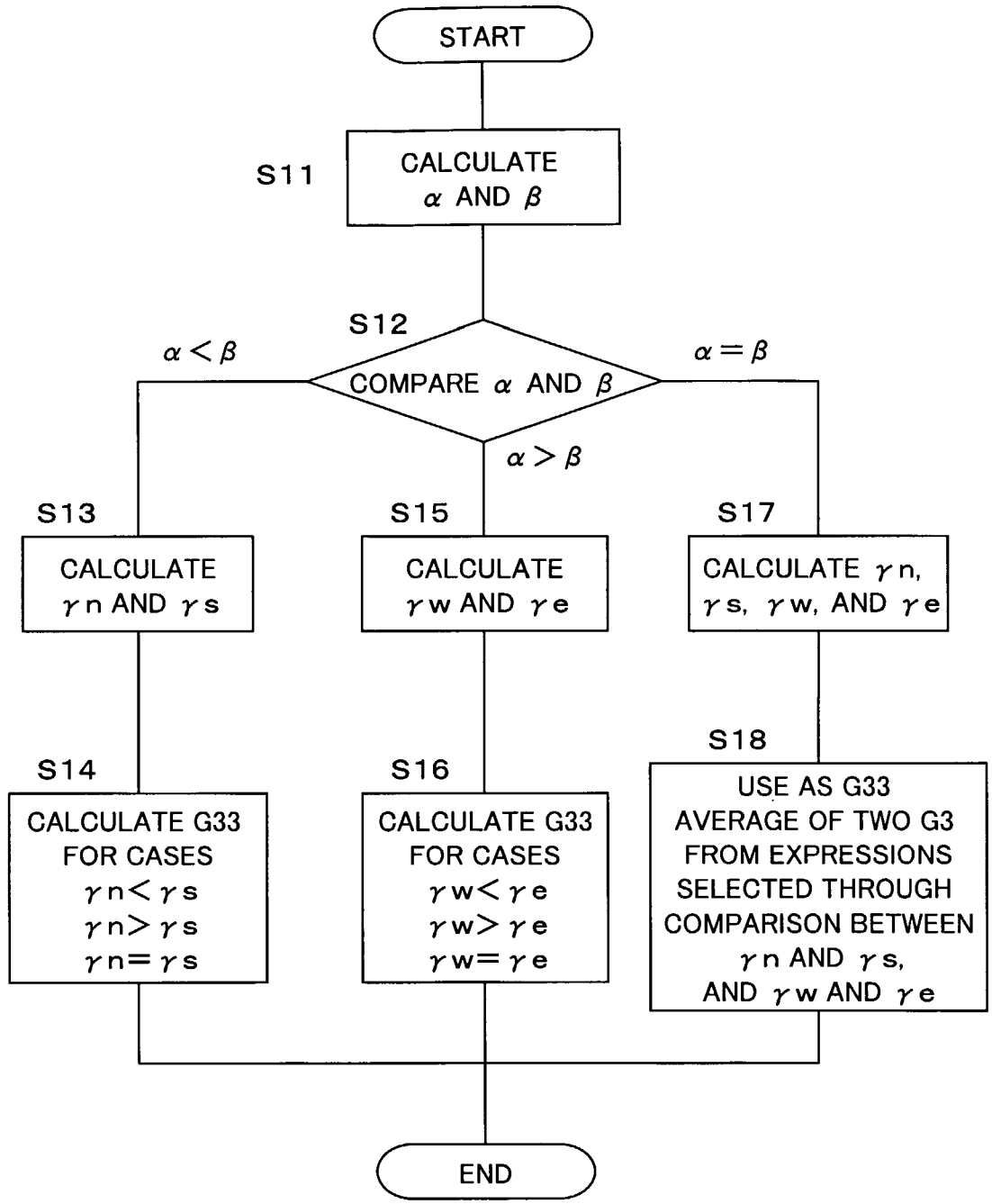
FIG. 4 is a flowchart for explaining interpolation for pixel G33.

In the following, interpolation of the pixel G33 will be described with reference to FIG. 4. In interpolation in this embodiment, parameters α and β are calculated as follows, for respectively measuring the extents of horizontal and vertical variations of a signal (S11).

$$\alpha = |G23-G43| + |R13-R33| + |R53-R33|$$

$$\beta = |G32-G34| + |R31-R33| + |R35-R33|$$

Then, the obtained α and β are compared to each other (S12), so that the values of pixels which are located in a direction determined, based on the obtained α and β, as having stronger continuity with the pixel value is used for interpolation. Further, an interpolated pixel value is believed to be closer to the pixel values of either one of the pairing pixels used for the interpolation, rather than the average of the values of the pixel pair, and, therefore, it is believed that an asymmetrical average, rather than a simple average, should be used for interpolation of the value of a missing pixel.

In this view, according to AAI, interpolation of a missing pixel is carried out depending on the cases classified in detail as described below.

$$(a) \alpha < \beta \tag{a}$$

As parameters to determine with which of the values of the pixels located north (that is, above) and south (that is, below) relative to the pixel to be interpolated, an interpolated pixel value will have stronger continuity, $$\gamma n = |R13-R33|$$

$$\gamma s = |R53-R33|$$

are calculated (S13).

When γn<γs, it is known that the north gradient is smaller than the south gradient, and accordingly, it is determined that continuity with the pixel north of the pixel of interest is stronger.

Similarly, when γn>γs, it is known that the south gradient is smaller than the north gradient, and accordingly, it is determined that continuity with the pixel south of the pixel of interest is stronger.

In interpolation, a larger weight is applied to the values of pixels which are located in a direction, either north or south in the above case, determined as having a stronger continuity with the pixel value. Specifically, the value of a green pixel G33, which is an object pixel for interpolation, is calculated as follows (S14).

for γn<γs, $$G33=\omega 1 G23+(1.0-\omega 1)G43+\omega 2(-R13+2R33-R53)/4$$

for γn>γs, $$G33=(1.0-\omega 1)G23+\omega 1 G43+\omega 2(-R13+2R33-R53)/4$$

In the above, ω1 and ω2 refer to weights, in which 0<ω1<1 and 0<ω2<1. When the relationship γn=γs holds, the average of the values calculated for the respective cases "γn<γs" and "γn>γs" is used as an interpolated value.

(b) α>β

Similar to the case of "α<β", as parameters to determine with which of the values of the pixels located east (that is, right) and west (that is, left) relative to the pixels to be interpolated, the interpolated pixel value will have stronger continuity $$\gamma w=|R31-R33|$$

$$\gamma e=|R35-R33|$$

are calculated (S15).

When the relationship γw<γe holds, it is known that the west gradient is smaller than the east gradient, and accordingly, it is determined that continuity with the pixel west of the pixel of interest is stronger.

Similarly, when γw>γe, it is known that the east gradient is smaller than the west gradient, and, accordingly, it is determined that continuity with the pixel east of the pixel of interest is stronger.

In interpolation, a larger weight is applied to the value of a pixel which is located in a direction, either east or west in the above case, determined as having a stronger continuity with the pixels to be interpolated and smaller variation. Specifically, the value of a green pixel G33, which is an object pixel for interpolation, is calculated as follows (S16).

for γw<γe, $$G33=\omega 1 G32+(1.0-\omega 1)G34+\omega 2(-R31+2R33-R35)/4$$

for γw>γe, $$G33=(1.0-\omega 1)G32+\omega 1 G34+\omega 2(-R31+2R33-R35)/4$$

In the above, ω1 and ω2 refer to weights, in which 0<ω1<1 and 0<ω2<1. When γw=γe is held, the average of the values calculated for the respective cases "γw<γe" and "γw>γe" is used as an interpolated value.

(c) α=β

The average of the interpolated values calculated for the above-described respective cases "α<β" and "α>β" is used as an interpolated value for green pixel G33.

Interpolation for Red and Blue

Because a missing red pixel and a missing blue pixel are interpolated using the same method, interpolation of a missing blue pixel will be described.

As for a missing blue pixel, three different situations are possible. That is, either blue pixels are located to the right and left of the missing blue pixel, blue pixels are located above and below the missing blue pixel, or blue pixels are located around the missing blue pixel such that the missing blue pixel is located at the center.

In the following, interpolation for pixel B23, pixel B32, and pixel B33 are referred to as cases which respectively represent the situations where blue pixels are located to the right and left of the missing blue pixel; blue pixels are located above and below the missing blue pixel; and blue pixels are located such that the missing blue pixel is located at the center.

Figure 5:
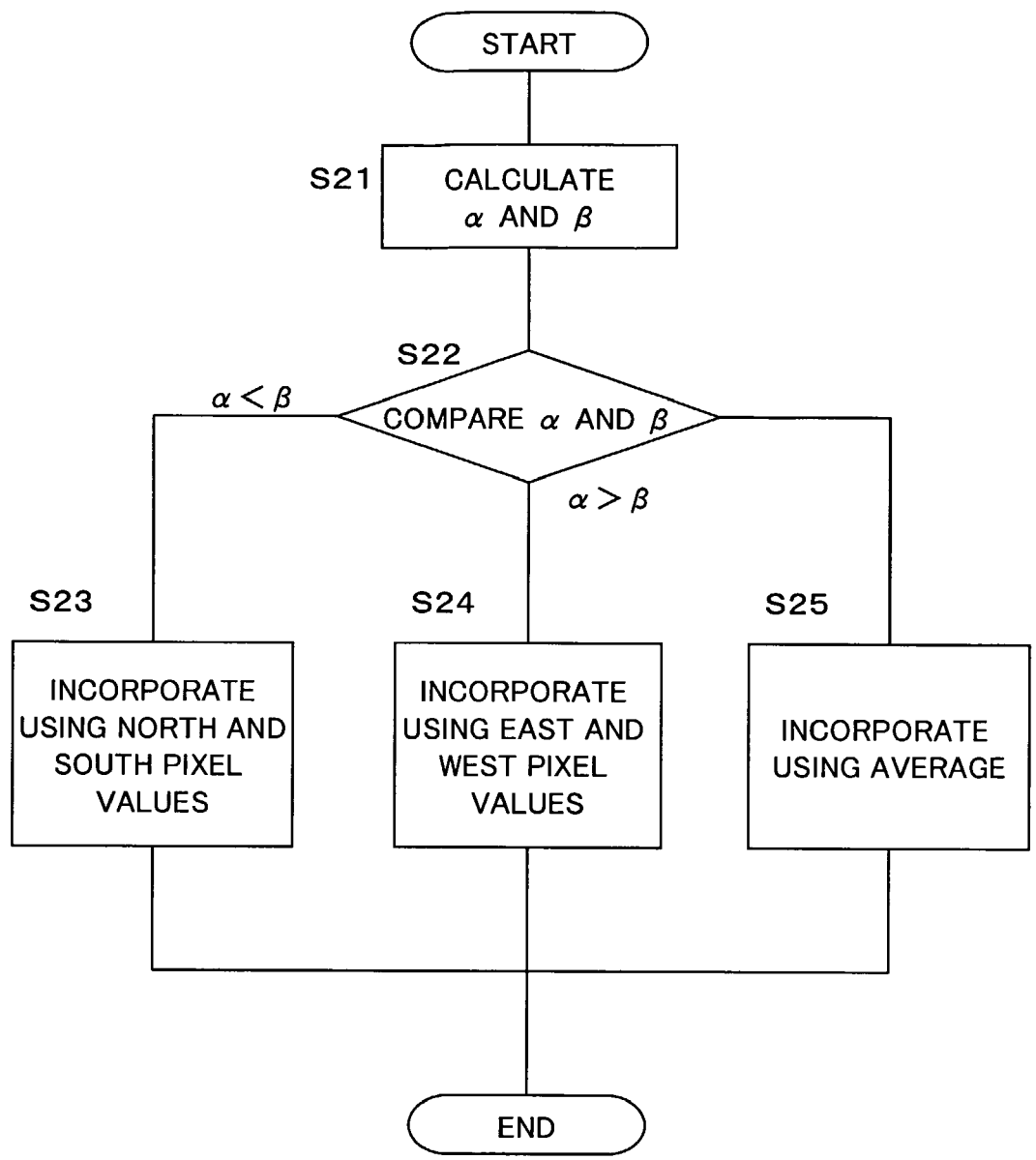
FIG. 5 is a flowchart for explaining interpolation for pixel B33.

While interpolated values of pixels B23 and B32 are obtained as follows, $$B23=(B22+B24)/2+(-G22+2G23-G24)/2$$

$$B32=(B22+B42)/2+(-G22+2G32-G42)/2$$

interpolation for blue pixel B33 will be described with reference to FIG. 5.

For interpolation for blue pixel B33, similar to interpolation for a green missing pixel, parameters α and β are calculated as follows, for respectively measuring the extents of horizontal and vertical variations of a signal (S21), $$\alpha=|G23-G33|+|G43-G33|$$

$$\beta=|G32-G33|+|G34-G33|$$

and then compared to each other (S22).

When α<β, blue pixel B33 is interpolated as follows (S23):

$$B33=(B23+B43)/2+(-G23+2G33-G43)/2$$

When α>β, blue pixel B33 is interpolated as follows (S24):

$$B33=(B32+B34)/2+(-G32+2G33-G34)/2$$

When α=β, the average of the results of the above two expressions is used as an interpolated value (S25)

Sharpening of Image

Figure 6:
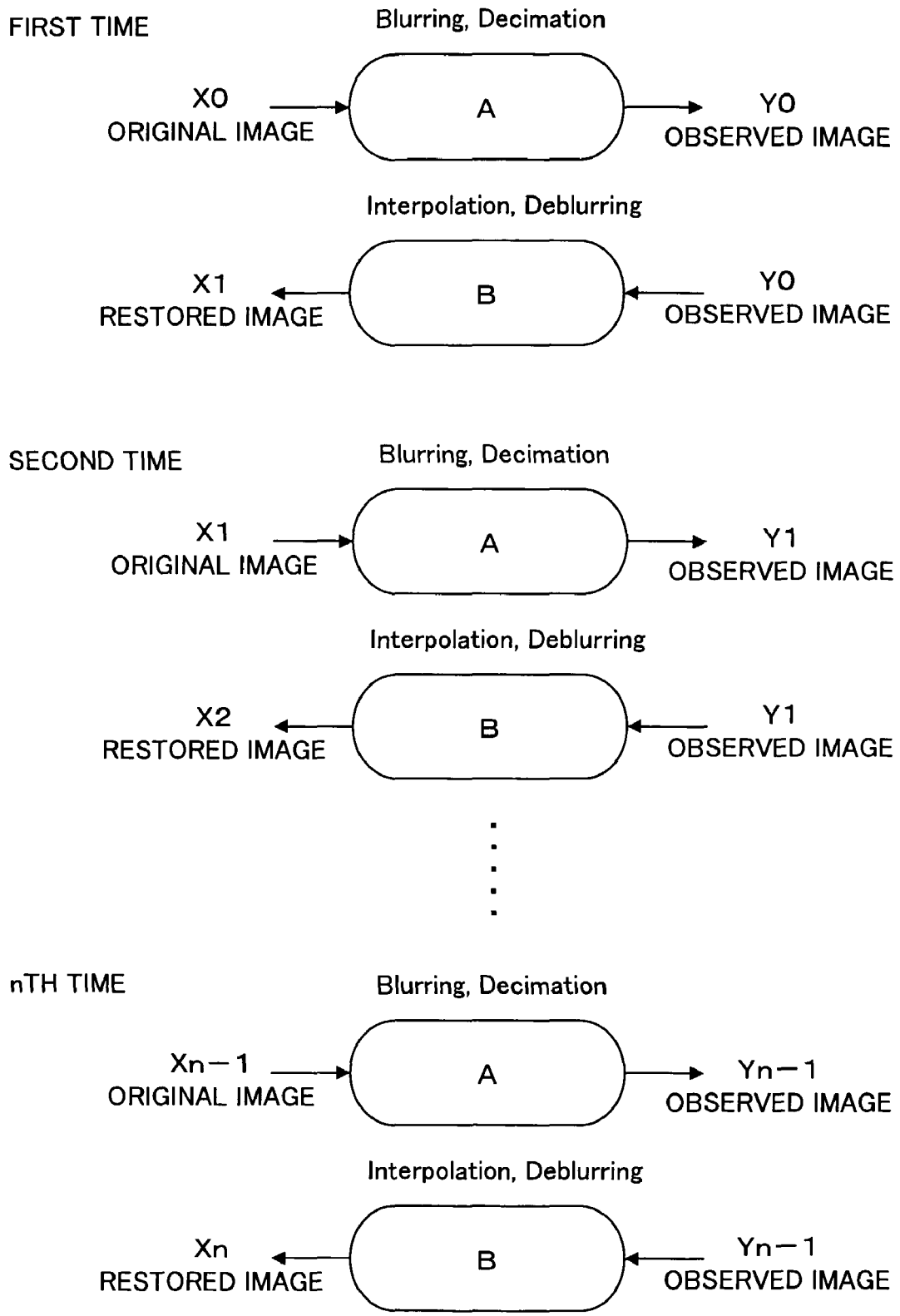
FIG. 6 is a diagram showing an image capturing and restoration model.

Image capturing and restoration can be modeled as shown in FIG. 6. In image capturing, an original image (original) is subjected to Process A for blurring and decimation, whereby an observed image is obtained. The observed image is subjected to Process B for interpolation and de-blurring, whereby the restored image (original) is restored.

An image resulting from interpolation for a missing pixel, as described above, generally suffers from deteriorated sharpness. In order to address this problem, process for sharpening is applied.

In the following, an introductory process of a restoration method in which sharpening processing is repetitively applied, as shown in FIG. 6, will be described.

x - - - A - - - >y (Expression 1)

x<- - - 1 /A - - - y (Expression 2)

The above (Expression 1) expresses a situation in which "x", indicative of a true image, or a field, is given Process A by being captured for its image, whereby an observed image "y" is obtained.

Here, a reverse process 1/A for restoring "x" from "y" is assumed, and a process which is substantially equal to the reverse process 1/A is denoted as Process B.

Then, the first restoration processing can be expressed as follows:

x0 - - - A - - - >y0 (Expression 3)

x1<- - - B - - - y0 (Expression 4)

In the above, "x0" refers to an original image, and "x1" refers to a restored image which approximates "x0". "x0" in Expression 3 corresponds to "x" in Expression 1.

The number attached to "x" or "y", or an index, refers to the number of times the restoration processing is repetitively applied. For example, "x1<- - - B - - - y0" expresses a situation in which an observed image "y0" is given Process B, whereby a restored (estimated) image "x1" is obtained. "x0" in "x0- - - A - - - >y0" is substituted by "x1". Accordingly, the next restoration processing can be expressed as follows:

$$x1 \text{- - - } A \text{- - - >} y1 \quad \text{(Expression 5)}$$

$$x2 \text{<- - - } B \text{- - - } y1 \quad \text{(Expression 6)}$$

The restoration processing is thereafter repeated at a certain number of times.

Differences of repetitive estimations of images, which are shown in FIG. 6 are listed as follows.

$$x0\text{-}x1 = By0\text{-}By1 \quad \text{(Expression 7)}$$

$$x1\text{-}x2 = By1\text{-}By2 \quad \text{(Expression 8)}$$

$$x2\text{-}x3 = By2\text{-}By3 \quad \text{(Expression 9)}$$

When the respective sides of the n-number of expressions, such as those listed above, are added, $$x0\text{-}xn = By0\text{-}Byn \quad \text{(Expression 10)}$$

is resulted.

Since $$yn = Axn \quad \text{(Expression 11)}$$

$$x0 = xn + B(y0 - Axn) \quad \text{(Expression 12)}$$

is resulted.

While assuming that "xn" is converged into "x0", this is described as follows:

$$x \text{<- - - } xn + B(y0 - Axn) \quad \text{(Expression 13)}$$

In this embodiment, in order to harmonize the sharpness of an image and to suppress the occurrence of a false color, interpolation by means of the above-described AAI for Process B is applied.

In the above-described examples, any peripheral pixels located in either horizontal or vertical directions relative to the pixel to be interpolated are selected as a pixel to be used in interpolation operation. However, the peripheral pixels also include pixels located in a diagonal direction relative to that pixel to be interpolated, and those pixels located in a diagonal direction may also be selected, instead of those in the horizontal and vertical directions, to be similarly processed. Selection of those pixels located in a diagonal direction enables consideration of the correlation in a diagonal direction.

When the correlation in a diagonal direction is strong, a weight may be applied on both sides, in that direction, of the object pixel for interpolation when performing interpolation. For example, in interpolation of pixel G33, $$\alpha' = (|G21 - G45| + |G12 - G54|)/2 + |R11 - R33| + |R55 - R33|$$

$$\beta' = (|G14 - G52| + |G41 - G25|)/2 + |R15 - R33| + |R51 - R33|$$

are calculated, and the calculated values may be contained in the comparison.

Weighting can be determined based on the comparison between $$\gamma 1 = |R11 - R33| \text{ and}$$

$$\gamma 2 = |R55 - R33|.$$

Interpolation calculation can be similarly performed while assuming the green pixels G in the diagonal directions as (G21+G12)/2, (G45+G54)/2, (G14+G41)/2, and (G52+G25)/2.

Performance Evaluation of AAI in the Embodiment

Although not so limited, the optical antialias filter may be a low pass filter having impulse response expressed as $$1/16 \begin{array}{ccc} 1 & 2 & 1 \\ 2 & 4 & 2 \\ 1 & 2 & 1 \end{array} \quad (26)$$

While substituting the respective AAI parameters $\omega 1$ and $\omega 2$ in Expression (green 1) and Expression (green 2) by $\omega 1 = 0.6$ and $\omega 2 = 0.4$, respectively, simulations are performed for the cases where AAI sharpening is not applied, where sharpening is repetitively applied five times, and where ACPI is applied.

In the simulations, party, picnic, portrait parrots ({Kodak Photo CD Sampler No. 3 USA IMG0060}) are used as test images.

Comparison results based on PSNR (Peak Signal to Noise Ratio)=20 log (second power of "Peek")/(second power of "MSE") are shown in Table 1, while comparison results based on MSE (Mean Square Error) are shown in Table 2. In PSNR, Peek is the maximum value of a dynamic range, such as 255 in the case of eight bits, for example.

AAI (0) refers to AAI with sharpening not applied, and AAI (5) refers to AAI with sharpening applied.

TABLE 1

| image name | Comparison in SPNR | | | | | | | | |
|---|---|---|---|---|---|---|---|---|---|
| | Red | | | Green | | | Blue | | |
| (size) | AAI(0) | AAI(5) | ACPI | AAI(0) | AAI(5) | ACPI | AAI(0) | AAI(5) | ACPI |
| party (1600 × 1200) | 33.05 | 36.19 | 33.07 | 32.31 | 36.63 | 32.24 | 31.38 | 34.55 | 31.37 |
| picnic (1600 × 1200) | 34.61 | 35.18 | 34.37 | 34.99 | 35.56 | 34.79 | 33.72 | 33.85 | 33.57 |
| portrait (1600 × 1200) | 34.31 | 36.20 | 34.32 | 33.43 | 36.48 | 33.05 | 33.06 | 36.33 | 33.05 |
| parrots (3072 × 2048) | 40.40 | 41.40 | 40.38 | 41.51 | 42.75 | 41.36 | 40.40 | 41.26 | 40.42 |
| parrots (1536 × 1024) | 40.88 | 43.37 | 40.84 | 41.63 | 43.93 | 41.38 | 40.75 | 43.39 | 40.72 |
| parrots (768 × 512) | 36.43 | 40.20 | 36.46 | 37.10 | 41.57 | 37.03 | 36.18 | 40.90 | 36.19 |

TABLE 2

Comparison in MSE

| image name (size) | Red | | | Green | | | Blue | | |
|---|---|---|---|---|---|---|---|---|---|
| | AAI(0) | AAI(5) | ACPI | AAI(0) | AAI(5) | ACPI | AAI(0) | AAI(5) | ACPI |
| party (1600 × 1200) | 32.19 | 15.64 | 32.04 | 38.20 | 14.13 | 38.85 | 47.56 | 22.82 | 47.46 |
| picnic (1600 × 1200) | 37.72 | 19.74 | 37.65 | 40.59 | 18.07 | 40.72 | 57.84 | 26.81 | 57.74 |
| portrait (1600 × 1200) | 24.09 | 12.67 | 24.06 | 29.50 | 12.56 | 29.86 | 32.17 | 18.68 | 32.21 |
| parrots (3072 × 2048) | 5.935 | 4.711 | 5.950 | 4.594 | 3.447 | 4.751 | 5.927 | 4.855 | 5.910 |
| parrots (1536 × 1024) | 5.306 | 2.989 | 5.356 | 4.465 | 2.630 | 4.728 | 5.466 | 2.980 | 5.505 |
| parrots (768 × 512) | 14.77 | 6.212 | 14.69 | 12.67 | 4.532 | 12.89 | 15.65 | 5.283 | 15.65 |

A comparison between AAI(0) and ACPI shows that for green AAI(0) is superior to ACPI in both PSNR and MSE. As for red and blue, AAI(0) is sometimes superior, and sometimes inferior, to ACPI to some extent. Thus, it may be concluded that, in interpolation for red and blue, AAI(0) and ACPI can exhibit substantially identical performance.

Then, in comparison between AAI(5) and AAI (0), AAI (5) turns out to be superior to AAI (0) for all images in PSNR and MSE. Consequently, efficiency of the sharpening processing can be confirmed with this result.

Focusing on the result of processing with the parrot images, it is understood that a larger effect can be achieved with a smaller image.

A comparison between AAI (5) and ACPI shows that AAI (5) is superior to ACPI for all images.

From the result of processing with the party image, it is confirmed that, while focusing on the pattern of the ribbon, the restored pattern appears blurred compared with the original image when AAI(0) or ACPI is applied, and as clear as the original image when AAI(5) is applied.

While focusing on the fork, the shape of the fork appears more definite with fewer false colors when AAI(5) is applied, compared with when AAI(0) or ACPI is applied. Thus, it can be concluded that AAI(5) can provide an image which appears sharp enough when evaluated by naked eyes.

As described above, as a method for demosaicing a mosaic image obtained using a single plate image capturing device which employs a Bayer-type color filter array (CFA), an Asymmetric Average Interpolation (AAI), which comprises two-step processing including interpolation of a missing pixel and sharpening of an image, is proposed, and when the efficiency of the proposed method is evaluated in an objective manner which employs PSNR and MSE, as well as in a subjective manner, conclusion is obtained that the proposed method is superior to the conventional methods, and can provide an image which is recognized as fine enough in an evaluation by naked eyes.

What is claimed is:

1. A method for interpolating captured color image data in a device for image processing by interpolating, based on captured color image data having single-color image data for each pixel, pixel data on other colors of each pixel, the method comprising:
    (a) a correlation detecting step of detecting correlation between image data of an object pixel and image data of peripheral pixels located in at least two directions selected from among horizontal, vertical, and diagonal directions relative to the object pixel;
    (b) a first correlation determining step of determining a direction having strong correlation, based on the correlation detected;
    (c) a second correlation determining step of determining, for the direction determined as having a strong correlation, correlation between the image data of the object pixel and image data of a pixel located in which direction relative to a location of the object pixel is strong;
    (d) an interpolation step of calculating image data on a color for interpolation of the object pixel based on results of the determinations made at the first and second correlation determining steps, in which a weight to be applied to image data of the pixel located in the direction determined at the second correlation determining step as having stronger correlation is increased based on image data of a peripheral pixel for a color same as the color for interpolation located in the direction determined at the first correlation determining step as having stronger correlation; and
    (e) adding the calculated image data in step (d) and weighted difference between the image data of the object pixel and image data on a color same as the color of the object pixel, of a peripheral pixel located in the direction selected from among horizontal, vertical, and diagonal directions relative to the object pixel.

2. A method according to claim 1, wherein
the correlation detecting step includes detection of a value α and a value β, and
the first correlation determining step includes comparison between the values α and β to determine that correlation associated with a value which is smaller is stronger,
the value α being a sum of an absolute value of a difference between image data on a color same as the color for interpolation, of pixels located in a horizontal direction relative to the object pixel with the object pixel placed therebetween, an absolute value of a difference between the image data of the object pixel and image data on a color same as the color of the object pixel, of a peripheral pixel located to the left of the object pixel, and an absolute value of a difference between the image data of the object pixel and image data on the color same as the color of the object pixel, of a peripheral pixel located to the right of the object pixel, and
the value β being a sum of an absolute value of a difference between image data on a color same as the color for interpolation, of pixels located in a vertical direction relative to the object pixel with the object pixel placed therebetween, an absolute value of a difference between the image data of the object pixel and image data on a color same as the color of the object pixel, of a peripheral pixel located above the object pixel, and an absolute value of a difference between the image data of the object pixel and image data on the color same as the color of the object pixel, of a peripheral pixel located below the object pixel.

3. The method according to claim 1, wherein sharpening processing is applied to an interpolated image obtained, by repetitively applying a predetermined sharpening operation thereto.

4. A computer-readable storage medium having a computer program product for causing a computer to interpolate captured color image data by interpolating, based on captured color image data which has single-color image data for each pixel, pixel data on other colors of each pixel, the computer program product having the computer to perform:
   (a) a correlation detecting step of detecting correlation between image data of an object pixel and image data of peripheral pixels located in at least two directions selected from among horizontal, vertical, and diagonal directions relative to the object pixel;
   (b) a first correlation determining step of determining a direction having strong correlation, based on the correlation detected;
   (c) a second correlation determining step of determining, for the direction determined as having a strong correlation, correlation between the image data of the object pixel and image data of a pixel located in which direction relative to a location of the object pixel is strong;
   (d) an interpolation step of calculating image data on a color for interpolation of the object pixel based on results of the determinations made at the first and second correlation determining steps, in which a weight to be applied to image data of the pixel located in the direction determined at the second correlation determining step as having stronger correlation is increased based on image data of a peripheral pixel for a color same as the color for interpolation located in the direction determined at the first correlation determining step as having stronger correlation; and
   (e) adding the calculated image data in step (d) and weighted difference between the image data of the object pixel and image data on a color same as the color of the object pixel, of a peripheral pixel located in the direction selected from among horizontal, vertical, and diagonal directions relative to the object pixel.

* * * * *